Sept. 8, 1936.  C. H. WELF  2,053,506

ATTACHMENT FOR LAWN MOWERS

Filed April 6, 1934

INVENTOR
CARL H. WELF
BY *Paul, Paul & Moore*
ATTORNEYS

Patented Sept. 8, 1936

2,053,506

UNITED STATES PATENT OFFICE 2,053,506

ATTACHMENT FOR LAWN MOWERS

Carl H. Welf, Minneapolis, Minn.

Application April 6, 1934, Serial No. 719,329

5 Claims. (Cl. 56—294)

This invention relates to an improved rake attachment for lawn mowers, comprising a plurality of teeth disposed in advance of the cutting blades of the mower and adapted to engage and lift or tear loose low-lying grasses which have a tendency to crawl along the surface of the ground such, for example, as crab grass, which is usually difficult to cut with an ordinary lawn mower, and whereby such objectionable grasses may be cut by the lawn mower simultaneously with the more desirable grasses.

Crab grass is very undesirable in a wel kept lawn, as it has a tendency to smother or kill out the more desirable grasses because of its inherent characteristic of crawling or spreading over the surface of the ground, and setting down new roots at intervals. Because of this undesirable grass not growing up straight, as do the more desirable grasses, it is difficult to cut with a lawn mower, and eventually smothers the other grasses. By drawing a rake or other toothed device over the surface of the lawn, the undesirable grasses may be brought to the surface or raised sufficiently so that they may be cut by a lawn mower. The attachment disclosed in this invention is adapted to be detachably secured to a conventional type of lawn mower, and comprises a rake bar having a plurality of depending teeth positioned in advance of the cutting blades of the lawn mower and adapted to rake over the surface of the lawn to thereby engage and bring the low lying grasses to the surface, whereby they may be cut by the lawn mower. The attachment is very light and simple in construction whereby the lawn mower may be operated in the usual manner without interference therefrom.

Objects of the invention reside in the specific construction of the attachment whereby it may be quickly attached to a lawn mower; in the compact and unitary construction thereof whereby it may readily be attached to the usual cross bar of the lawn mower in such a manner as to cause the entire attachment to be disposed substantially within the confines of the peripheries of the wheels of the mower, whereby the mower may be inverted, to permit its being rolled from place to place in the usual manner; and, in the provision of means for preventing the cutter bar of the lawn mower from tipping upwardly, when the teeth of the attachment engage an obstruction.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

Figure 3:
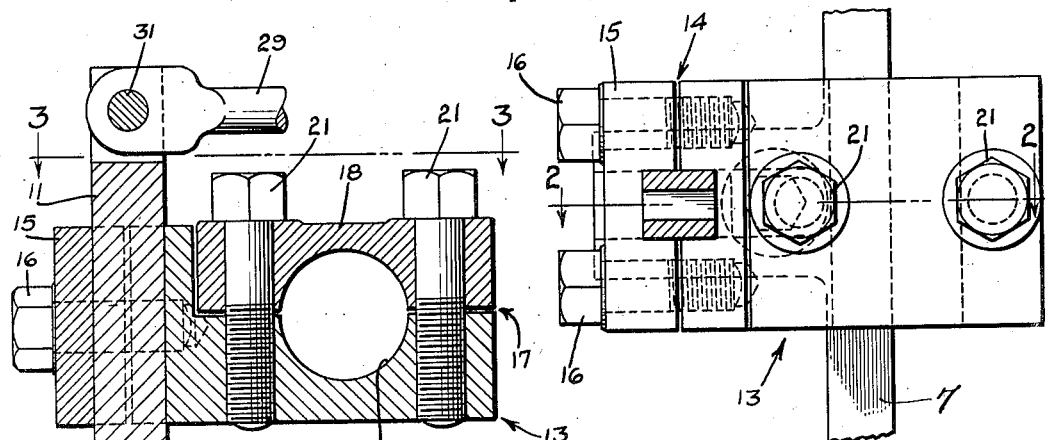
Figure 2:
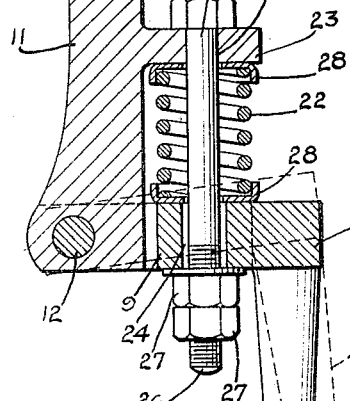
Figure 2 is an enlarged cross-sectional view on the line 2—2 of Figure 3, showing the attachment removed from the lawn mower.
Figure 4:
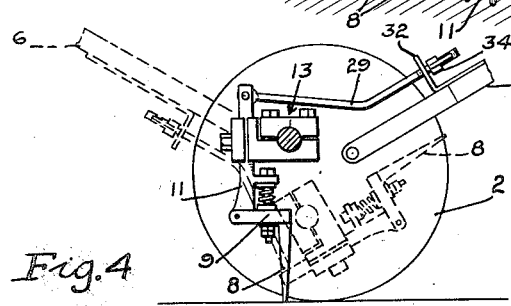

Figure 3 is a plan view on the line 3—3 of Figure 2, showing the means for securing the attachment to the usual cross bar of the lawn mower; and Figure 4 is a diagrammatic view showing in full lines the attachment in its working position, and the dotted lines showing the position of the attachment when the lawn mower is turned over or inverted, as when rolling it from one place to another with the reel inoperative.

Figure 1:
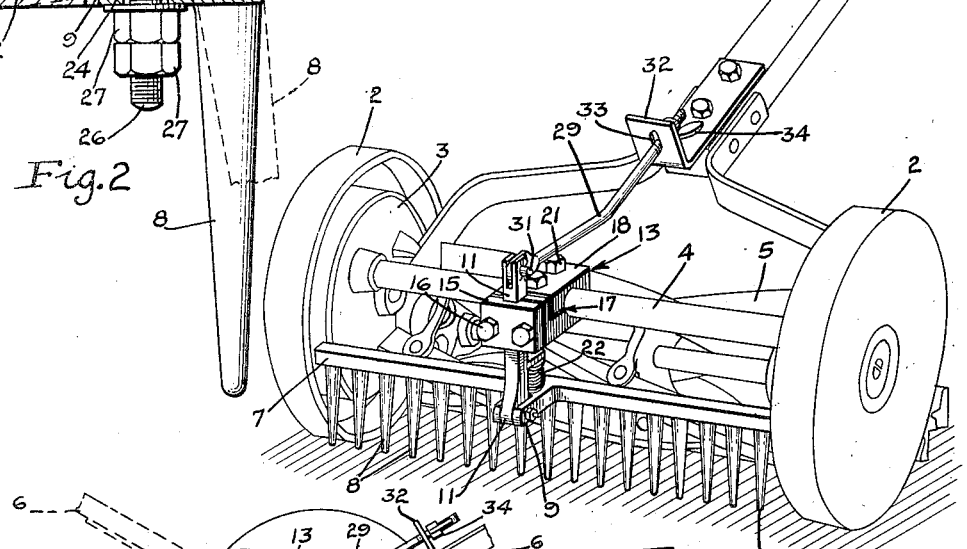
Figure 1 is a perspective view of a lawn mower showing the invention applied thereto.

In the selected embodiment of the invention here shown, for purposes of disclosure, there is illustrated in Figure 1, a conventional type of lawn mower comprising the usual traction wheels 2, frame 3, cross bar 4, cutting blades or reel 5, and operating handle 6.

The novel attachment herein disclosed comprises a rake bar 7 having a plurality of closely spaced teeth 8 suitably secured thereto and depending therefrom, as shown in Figures 1 and 2. The rake bar 7 is shown provided with a forwardly extending projection or lug 9 which may be forked, as shown in Figure 1, to receive the lower end of a hanger 11, pivotally connected thereto by a suitable pivot pin or bolt 12. In the drawing, I have shown the rake bar 7, teeth 8, and projection 9 as being integrally formed of cast metal such, for example, as aluminum. It is to be understood, however, that the rake teeth may be independently formed and secured to the rake bar 7 in any suitable manner, and that the projection or lug 9 may also be independently formed and suitably secured thereto.

The hanger 11 is preferably square or rectangular in cross section, as best shown in Figures 1 and 3, and is adjustably secured in one end of a clamping device, generally indicated by the numeral 13. The forward end of this clamping device is split vertically, as shown at 14 in Figure 3, to thereby provide a cap 15 which is shown detachably secured to the body of the clamping device by cap screws 16, whereby the shank of the hanger 11 may be rigidly secured in adjusted position in the clamping device, as will readily be understood by reference to Figures 2 and 3.

The body of the clamping device 13 is also split horizontally, as shown at 17 to provide a cap 18, and has a transverse bore 19 adapted to receive the usual cross bar 4 of the lawn mower, as shown in Figure 1. By removing the cap 18 from the clamping device, the latter may readily be secured to the cross bar 4 of the lawn mower, by simply tightening the cap screws 21 which secure the cap 18 of the body of the clamping device.

Means is provided for permitting the teeth 8 to yield when they engage an obstruction during forward movement of the lawn mower. Such means is best shown in Figure 2, and may consist of a suitable compression spring 22 having its lower end seated against the upper surface of the projection or lug 9 of the rake bar 7, and its upper end against a rearwardly projecting lug 23 provided upon the hanger 11. The lug 9 has an aperture 24 alined with an aperture 25 in the lug 23, which apertures are adapted to receive a bolt 26 having suitable lock nuts 27 secured to the lower threaded end portion thereof, whereby the tension of the spring 22 may be somewhat varied, and also whereby the terminals of the rake teeth may be adjusted with respect to the ground surface. Suitable cup-shaped washers 28 are shown provided at each end of the spring 22 for retaining the spring in axial alinement with the bolt 26.

The aperture 24 in the projection or lug 9 of the rake bar is shown relatively larger than the aperture 25 of the lug 23 of the shank 11 to thereby permit the rake bar to be swung upwardly to the dotted line position, indicated in Figure 2, should the rake teeth 8 engage an obstruction when the mower is in operation.

Another feature of the invention resides in the means provided for preventing the rear end portion of the mower frame, to which the usual cutter bar is secured, from tilting upwardly when the teeth 8 of the rake bar engage an obstruction. The means provided for thus preventing the cutter bar from tipping upwardly or lifting, is best shown in Figure 1, and comprises a suitable connection 29 having one end pivotally connected to the upper end of the hanger 11 by a suitable pivot pin 31, and its opposite end loosely connected to a bracket 32 secured to the lower end of the mower handle 6. The bracket 32 is shown having a slotted aperture 33 for receiving the upper or rear portion of the connection or rod 29. The rear end portion of the rod 29 is threaded to receive an ordinary wing nut 34 which normally is positioned in proximity to the bracket 32 so as to engage the latter each time the rear portion of the lawn mower tends to tilt upwardly, as a result of the rake teeth engaging an obstruction. Thus, when the mower is operated in a patch of crab or similar grass, the cutter bar and cutting blades of the lawn mower may be maintained in normal contact with the ground as a result of the connection 29 being connected to the lower end of the mower handle 6, it being understood that the operator will bear down upon the mower handle when operating in such grass.

Another feature of this invention resides in the unique construction of the attachment, whereby it is very compact and when mounted upon a lawn mower, will be disposed substantially within the confines of the peripheries of the mower wheels, as clearly illustrated in Figure 4. By thus constructing and arranging the attachment on the lawn mower, the mower may be inverted and rolled from place to place in the usual manner, upon its wheels, as the attachment will be disposed within the confines of the peripheries of the mower wheels, as indicated by the dotted lines in Figure 4.

The compression spring 22, which yieldably retains or holds the rake teeth 8 in their working positions, is preferably arranged as shown in Figure 2, whereby the rake bar and hanger 11, including the spring 22 and its associated parts, may readily be detached from the clamping device 13, as a unit, and without disturbing the setting or adjustment of the spring 22. In some cases, it may be desirable to connect the upper end of the spring directly with the clamping device 13, but when thus arranged, means must be provided for adjusting the tension of the spring each time the rake bar 7 is vertically adjusted with respect to the clamping device 13. In actual practice, I have found it more desirable to arrange the spring as shown in Figure 2, whereby the rake bar, shank, and spring may be assembled as a unit, independently of the clamping device.

The attachment has been found to operate very efficiently on conventional types of domestic lawn mowers and also on power operated lawn mowers, and the rake bar may be furnished in different widths, whereby the attachment may be used on lawn mowers of different widths.

The attachment has proven very efficient and practical in actual use, and if used each time the grass is cut or mowed, will eventually result in the extermination of crab grass, and various other undesirable, low-lying or creeping grasses, as it will substantially prevent them from going to seed and thus receding themselves. I have also found, from actual experience, that most lawns, even though substantially free from the more undesirable grasses, are benefited by periodically being subjected to the action of a rake, as such treatment separates the blades of the grass and thus has an aerating effect thereon, which tends to stimulate and promote growth. It may also be used for raking or scratching the surface of a lawn, following the application of a commercial fertilizer thereto, whereby such material may be conveniently worked into the grass.

I claim as my invention:

1. A rake attachment for a lawn mower comprising a rake bar having a plurality of teeth and a forward extension, a hanger adapted to be detachably secured to the lawn mower, means for pivotally connecting the lower end of the hanger to the forward extension of the rake bar, whereby the rake bar is spaced rearwardly of said pivotal connection so that when the rake teeth engage an obstruction, they may swing upwardly thereover, and spring means interposed between the rake bar and hanger for normally yieldably holding the teeth in a working position.

2. A rake attachment for a lawn mower comprising a rake bar having a plurality of teeth, a forwardly extending lug on said rake bar, a hanger having means for adjustably securing it to the lawn mower, means at the lower end of the hanger for pivotally connecting it to the forward end of the lug of the rake bar, a spring interposed between said lug and a portion of the hanger for constantly urging the rake bar downwardly, and a stop for limiting the downward movement of the rake bar, said stop being adjustable whereby the rake teeth may be relatively adjusted with respect to the ground surface.

3. An attachment for a lawn mower, comprising a rake bar having a plurality of teeth depending therefrom, a forwardly extending projection or lug on said rake bar, a hanger pivotally connected to the forward end of said projection, a bracket for supporting said hanger, said bracket being secured to the frame of the lawn mower forwardly of the cutting blades thereof, whereby the rake teeth may engage the grass ahead of the cutting blades when the mower is advanced, resilient means operatively associated with the hanger and rake bar and constantly urging the rake teeth into working position with respect to the ground, and the pivotal connection between the hanger and the rake bar being located forwardly of the rake teeth, whereby when said teeth engage a relatively fixed obstruction, they may swing upwardly over the same.

4. An attachment for a lawn mower, comprising a rake bar having a plurality of teeth depending therefrom, a forwardly extending projection or lug on said rake bar, a hanger pivotally connected to the forward end of said projection, a bracket for detachably securing the hanger to the mower forwardly of the cutting blades thereof, whereby the rake teeth will engage the grass ahead of the cutting blades when the mower is advanced, resilient means operatively associated with the hanger and rake bar and constantly urging the rake teeth into working position with respect to the ground, said rake bar, hanger, and resilient means being assembled as a unit independently of the supporting bracket, and whereby said rake unit may be removed from the mower without detaching the supporting bracket therefrom, and the pivotal connection between the hanger and the rake bar being located forwardly of the rake teeth, whereby when the teeth engage a relatively fixed object, they may swing upwardly over the same.

5. The combination with a lawn mower comprising traction wheels, a front cross bar, an operating handle, and a rearwardly extending frame mounted for pivotal movement about a horizontal axis and upon which the usual cutting mechanism is mounted, of a rake attachment comprising a plurality of spring-actuated teeth arranged to engage the grass in advance of the cutting mechanism, a hanger and a bracket for detachably securing the teeth to the mower cross bar, and means for connecting the upper end of the hanger to the mower handle to prevent the rear end of the mower from swinging upwardly about said axis, when the rake teeth engage an obstruction, said teeth being adapted to yield and pass over the obstruction without interrupting forward movement of the mower.

CARL H. WELF.